US008500248B2

(12) United States Patent
Takahashi

(10) Patent No.: US 8,500,248 B2
(45) Date of Patent: Aug. 6, 2013

(54) METHOD OF MANUFACTURING NOZZLE PLATE, LIQUID EJECTION HEAD AND IMAGE FORMING APPARATUS

(75) Inventor: Shuji Takahashi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/238,802

(22) Filed: Sep. 21, 2011

(65) Prior Publication Data

US 2012/0007920 A1 Jan. 12, 2012

Related U.S. Application Data

(62) Division of application No. 11/723,913, filed on Mar. 22, 2007, now Pat. No. 8,043,518.

(30) Foreign Application Priority Data

Mar. 23, 2006 (JP) ................................ 2006-081129

(51) Int. Cl.
*B41J 2/14* (2006.01)
*G01D 15/00* (2006.01)
*G11B 5/127* (2006.01)

(52) U.S. Cl.
USPC .............................................. 347/47; 216/27

(58) Field of Classification Search
USPC .............................................. 347/68; 216/27
See application file for complete search history.

(56) References Cited

U.S. PATENT DOCUMENTS 4,059,480 A 11/1977 Ruh et al.
5,201,987 A 4/1993 Hawkins et al.
6,143,190 A 11/2000 Yagi et al.
6,378,995 B1 4/2002 Yun et al.
6,397,467 B1 6/2002 Werner et al.
7,041,226 B2 5/2006 Vaideeswaran et al.
2003/0030696 A1 2/2003 Sato et al.
2004/0067446 A1 4/2004 Hall et al.
2004/0080574 A1 4/2004 Masumi
2006/0176338 A1 8/2006 Deguchi et al.
2010/0165048 A1 7/2010 DeBrabander et al.

FOREIGN PATENT DOCUMENTS

JP 2001-30500 A 2/2001

OTHER PUBLICATIONS

Office Action dated Jun. 22, 2011 in U.S. Appl. No. 11/723,913.
Office Action dated Mar. 4, 2011 in U.S. Appl. No. 11/723,913.
Office Action dated Sep. 3, 2010 in U.S. Appl. No. 11/723,913.

*Primary Examiner* — Matthew Luu
*Assistant Examiner* — Lisa M Solomon
(74) *Attorney, Agent, or Firm* — Birch, Stewart, Kolasch & Birch, LLP

(57) ABSTRACT

The method of manufacturing a nozzle plate which includes a nozzle having a tapered section and a linear section includes the steps of: forming an etching stopper layer for stopping dry etching of a silicon substrate, on a first surface of the silicon substrate; forming a mask layer on a second surface of the silicon substrate reverse to the first surface; performing a first patterning process with respect to the mask layer so that an opening section is formed in the mask layer; carrying out the dry etching of the silicon substrate through the opening section in the mask layer so that the tapered section of the nozzle is formed in the silicon substrate; carrying out dry etching of the etching stopper layer through the opening section in the mask layer so that at least a part of the linear section of the nozzle is formed in the etching stopper layer; and removing the mask layer.

2 Claims, 9 Drawing Sheets

METHOD OF MANUFACTURING NOZZLE PLATE, LIQUID EJECTION HEAD AND IMAGE FORMING APPARATUS

This application is a Divisional Application of application Ser. No. 11/723,913 filed on Mar. 22, 2007 now U.S. Pat No. 8,043,518, and for which priority is claimed under 35 U.S.C. §120; and this application claims the benefit of priority under 35 U.S.C. §119 of Japanese Application No. 2006-081129 filed in Japan on Mar. 23, 2006; the entire disclosure of each is incorporated herein by reference.

BACKGROUND OF THE INVENTION

1. Field of the Invention

The present invention relates to a method of manufacturing a nozzle plate, and to a liquid droplet ejection head and an image forming apparatus, and more particularly, to a method of manufacturing a nozzle plate used for an ejection surface of a print head of an inkjet type image forming apparatus, or the like.

2. Description of the Related Art

The print head of an inkjet type image forming apparatus has a plurality of nozzles formed in a nozzle plate which constitutes an ejection surface opposing the recording medium. The shape of the nozzles which eject ink droplets onto the recording medium is liable to affect the size and the ejection speed, and the like, of the ink droplets, and therefore, the nozzles should be formed to a high degree of accuracy. If a linear section is formed at each of the outlet portions of the nozzles in the nozzle plate, then it is possible to improve the linear travel characteristics of ink droplets ejected.

Japanese Patent Application Publication No. 2001-30500 discloses a method of manufacturing a nozzle plate of this kind. FIGS. 10A to 10F are diagrams showing the method of manufacture described in Japanese Patent Application Publication No. 2001-30500. A silicon substrate 160 shown in FIG. 10A is prepared, and a boron layer 171 is formed on one surface of the silicon substrate 160, as shown in FIG. 10B. This boron layer 171 acts as an etching stopper. Thereupon, as shown in FIG. 10C, the other surface of the silicon substrate 160, on which a boron layer 171 is not formed, is covered with a photoresist 172, or the like (i.e., masking is performed), and is then patterned. Wet etching is then carried out using a crystal anisotropic etching solution, as shown in FIG. 10D. Thereby, the surface which is not formed with the boron layer 171 is etched in a square pyramid shape, and the tapered section 151A of a nozzle 151 is formed. The photoresist 172, and the like, is then removed. Next, as shown in FIG. 10E, the boron layer 171 is covered with a photoresist 175, or the like (masking), and is then patterned, whereupon dry etching is carried out to form a linear portion of the nozzle. Thereupon, as shown in FIG. 10F, the photoresist 175, and the like, is removed, and consequently the nozzle plate 161 is completed.

However, there are the following possibilities in manufacture methods of this kind.

More specifically, in the method of manufacturing a nozzle plate disclosed in Japanese Patent Application Publication No. 2001-30500, since crystal anisotropic wet etching is used, then the process is dependent on the crystalline orientation of the silicon substrate 160 and hence the tapered section 151A of the nozzle 151 is limited to a square pyramid shape. Moreover, there are also limitations on the angle of taper. Furthermore, since the tapered section and the linear section of a nozzle are formed by carrying out etching from the front surface side and the rear surface side of the silicon substrate 160 respectively, then divergence of the central axis positions can occur between the tapered section of the nozzle and the linear section of the nozzle.

SUMMARY OF THE INVENTION

The present invention has been contrived in view of the foregoing circumstances, an object thereof being to provide a method of manufacturing a nozzle plate whereby a tapered section of a nozzle can be formed freely in terms of the cross-sectional shape or the angle. Furthermore, it is another object of the present invention to provide a method of manufacturing a nozzle plate whereby a tapered section and a linear section of a nozzle can be reliably aligned in position.

In order to attain the aforementioned object, the present invention is directed to a method of manufacturing a nozzle plate which includes a nozzle having a tapered section and a linear section, the method comprising the steps of: forming an etching stopper layer for stopping dry etching of a silicon substrate, on a first surface of the silicon substrate; forming a mask layer on a second surface of the silicon substrate reverse to the first surface; performing a first patterning process with respect to the mask layer so that an opening section is formed in the mask layer; carrying out the dry etching of the silicon substrate through the opening section in the mask layer so that the tapered section of the nozzle is formed in the silicon substrate; carrying out dry etching of the etching stopper layer through the opening section in the mask layer so that at least a part of the linear section of the nozzle is formed in the etching stopper layer; and removing the mask layer.

In this aspect of the present invention, since the tapered section of the nozzle is formed by dry etching, then the process is not dependent on the crystalline orientation of the silicon substrate. Hence, the cross-sectional shape of the tapered section of the nozzle is not limited to being a square shape, and the cross-sectional shape of the tapered section can be formed freely to any shape, such as a circular shape. Moreover, it is also possible to set the angle of taper freely.

Moreover, dry etching is carried out from the side of the mask layer when each of the tapered section and the linear section is formed, and the direction of etching treatment is common to the tapered section formation and the linear section formation. Accordingly, it is possible to align the positions of the central axes of the tapered section and the linear section of the nozzle, reliably. Therefore, the transition between the tapered section and the linear section of the nozzle is smooth and the inner surface of the nozzle can be formed to a high degree of accuracy. Consequently, the flow of ink inside the nozzle can be stabilized, and the ejection of ink can also be stabilized.

The material of the etching stopper layer may be an oxide material, a nitride material or a carbide material. The appropriate material may be selected according to the etching selectivity (selectivity rate) with respect to the silicon substrate. The type of plasma for forming the linear section of the nozzle is selected in accordance with the material of the etching stopper layer.

Preferably, the step of carrying out the dry etching of the silicon substrate to form the tapered section of the nozzle in the silicon substrate, includes the steps of: carrying out a first dry etching with respect to a portion of the silicon substrate which has a first etching area; forming a first protective film on a surface of the silicon substrate which is formed by the first dry etching; carrying out a second dry etching with respect to a portion of the silicon substrate which has a second etching area smaller than the first etching area; and forming a second protective film on a surface of the silicon substrate which is formed by the second dry etching.

In this aspect of the present invention, dry etching is carried out in such a manner that etching in the directions of the side faces of the nozzle is suppressed due to the formation of the protective film, and the etched area is controlled so as to be reduced successively in the perpendicular direction (the liquid ejection direction in which the liquid is ejected from the nozzle) of the nozzle. Thereby, it is possible to form the tapered section of the nozzle to a high degree of accuracy.

Preferably, the dry etching to form the tapered section of the nozzle is carried out using a mixed gas including a gas for the dry etching of the silicon substrate and a gas for forming a protective film.

In this aspect of the present invention, dry etching is carried out using a mixed gas including a gas for etching and gas for a protective film formation, in such a manner that etching in the directions of the side faces of the nozzle is suppressed due to the formation of the protective film, and the etched area is controlled so as to be reduced successively in terms of the perpendicular direction (liquid ejection direction) of the nozzle. Thereby, it is possible to form the tapered section of the nozzle to a high degree of accuracy by appropriately selecting components and adjusting the component ratio of the mixed gas.

In this case, by setting the silicon substrate to a low temperature state (cryo-state), the conditions for controlling the tapered section of the nozzle can be set more freely.

Preferably, the method of manufacturing a nozzle plate further comprises the steps of: forming a photosensitive resin layer on the mask layer; and performing a second patterning process with respect to the photosensitive resin layer, wherein etching of the mask layer is carried out using the photosensitive resin layer which has been subject to the second patterning process as a mask so that the first patterning process with respect to the mask layer is carried out.

In this aspect of the present invention, since the mask function during etching of the silicon substrate and the etching of the stopper layer can be fulfilled by the mask layer, then the photosensitive resin may be formed thinly as long as the patterning of the mask layer can be carried out normally. Since the patterning of the photosensitive resin film can thus be carried out to a high degree of accuracy, then it is possible to carry out the patterning of the mask layer with high accuracy. Consequently, it is possible to form the nozzle to a high degree of accuracy.

Preferably, the method of manufacturing a nozzle plate further comprises the steps of: forming a liquid repellent film on the etching stopper layer; and carrying out dry etching of the liquid repellent film through the opening section in the mask layer so that a part of the linear section of the nozzle is formed in the liquid repellent film.

In this aspect of the present invention, it is possible to form the liquid repellent film (which has a function of stabilizing the liquid ejection) to a high degree of accuracy at the perimeter of the opening section of the nozzle on the ink ejection surface, and therefore the direction of flight of a liquid droplet during the ejection is stabilized and the ejection state in the nozzle is improved.

In order to attain the aforementioned object, the present invention is also directed to a liquid ejection head comprising a nozzle plate manufactured by any one of the above-mentioned methods of manufacturing a nozzle plate.

In order to attain the aforementioned object, the present invention is also directed to an image forming apparatus comprising the above-mentioned liquid ejection head.

In the present invention, it is possible to provide a method of manufacturing a nozzle plate in which a tapered section of a nozzle can be designed freely in terms of the cross-sectional shape and the angle of taper, and the positions of the tapered section and a linear section of the nozzle can be aligned.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein.

DETAILED DESCRIPTION OF THE PREFERRED EMBODIMENTS

Method for Manufacturing Nozzle Plate

Firstly, a method of manufacturing a nozzle plate which is one of characteristics of an embodiment of the present invention is described below.

Figure 1A:
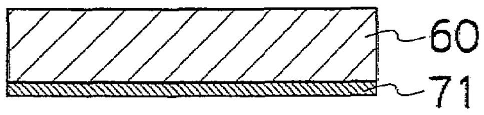
FIGS. 1A to 1F are diagrams showing steps of manufacturing a nozzle plate according to a first embodiment of the present invention.

FIGS. 1A to 1F are illustrative diagrams showing steps of manufacturing a nozzle plate according to a first embodiment. Firstly, as shown in FIG. 1A, in an etching stopper layer formation step, an etching stopper layer 71 is formed on a silicon substrate 60. The etching stopper layer 71 displays the function of inhibiting the progress of the etching in the subsequent tapered section formation step, as described below.

A bare substrate having a thickness of 20 to 300 μm is used for the silicon substrate 60. Taking account of the selection ratio between the etching stopper layer 71 and the silicon substrate 60, the etching stopper layer 71 is formed of an inorganic material, such as silicon oxide $SiO_2$, silicon nitride SiN, silicon carbide SiC, or the like. In this case, the film formation of the etching stopper layer 71 is carried out using a vacuum vapor deposition method, a sputtering method, a CVD method, or the like. Alternatively, an organic liquid material, such as polyimide, may be used, and in this case, the material is applied by a spin coating technique and then cured by heating at a desired temperature.

The etching stopper layer 71 may be constituted by a single layer or by a plurality of layers. Furthermore, it would also be possible to use a silicon substrate provided with oxide films, and in this case, the oxide film on one surface of the silicon substrate is used as the etching stopper layer, and the oxide film on the other surface is removed.

Figure 1B:
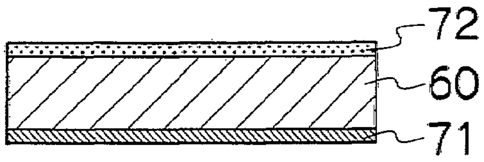

Next, in a mask layer formation step, as shown in FIG. 1B, a mask layer 72 is formed on the surface of the silicon substrate 60 reverse to the surface where the etching stopper layer 71 has been formed. More specifically, a photosensitive resin, such as resist, is formed, and pre-baking is then carried out to evaporate the solvent from the resist, and thereby the mask layer 72 which has improved adhesion to the silicon substrate 60 is formed. If a resist in the form of a sheet is used for the mask layer 72, then it is not necessary to carry out pre-baking. Moreover, the thickness of the mask layer 72 is set according to the selection ratio between the mask layer 72 and the silicon substrate 60.

Figure 1C:
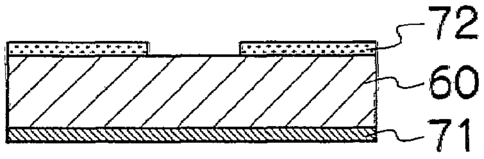

Thereupon, in a mask patterning step, as shown in FIG. 1C, the mask layer 72 formed by the resist is patterned by photolithography. More specifically, the mask layer 72 is patterned through an exposure process (to expose the mask layer), a development process (to develop the mask layer), and a post-baking process (to perform post baking with respect to the mask layer). In this case, instead of the post-baking process, it is possible to carry out a UV curing process (to cure the mask layer with ultraviolet radiation). The exposure conditions, development conditions and post-baking conditions are specified according to the thickness of the mask layer 72, which is set in accordance with the type of resist used for the mask layer 72.

Figure 1D:
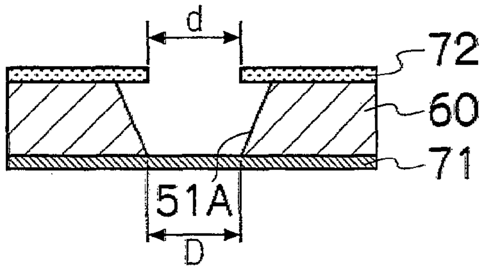

Next, in a tapered section formation step, as shown in FIG. 1D, dry etching is carried out on the surface of the silicon substrate 60, from the side of the mask layer 72; thereby, a tapered section 51A of the nozzle 51 is formed in the silicon substrate 60. Since dry etching is carried out in this way, rather than wet etching, then the process is not dependent on the crystalline orientation of the silicon substrate 60, and therefore the cross-sectional shape of the tapered section 51A of the nozzle 51 is not limited to being a square shape, and it can be formed freely to a desired shape, such as a circular shape. Moreover, it is possible to set the angle of taper freely.

Several specific methods of forming the tapered section 51A of a nozzle 51 are described below.

Figure 2A:
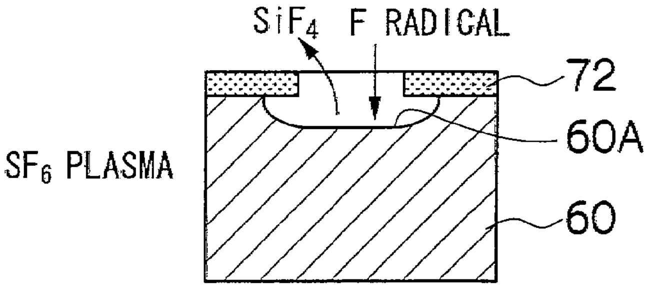
FIGS. 2A to 2E are diagrams showing a first forming method for a tapered section of a nozzle.

Firstly, there is a first forming method in which dry etching and formation of a protective film are alternated repeatedly, as shown in FIGS. 2A to 2E. This forming method is described in detail below. Firstly, the silicon substrate 60 is disposed on top of a planar electrode (not illustrated) which is connected to a high-frequency power supply, and a high-frequency electric power is then applied to the planar electrode. Thereupon, as shown in FIG. 2A, an $SF_6$ plasma (sulfur hexafluoride plasma) which is generated by introducing an $SF_6$ gas (sulfur hexafluoride gas) is radiated. Thereby, the fluorine radicals (F radicals) in the $SF_6$ plasma react with the silicon, and this reaction occurs at the exposed portion 60A of the silicon substrate that is not covered with the patterned mask layer 72. An $SiF_4$ gas (silicon tetrafluoride gas) produced through this reaction is discharged from the silicon substrate 60, and the etching of the silicon substrate 60 is thus carried out isotropically.

Figure 2B:
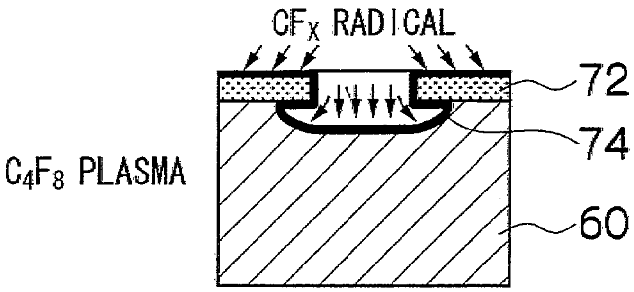

Thereupon, the application of the high-frequency power to the planar electrode is halted, and as shown in FIG. 2B, a $C_4F_8$ plasma (octafluorocyclobutane plasma) generated from $C_4F_8$ gas (octafluorocyclobutane gas) is radiated. A CF-type polymer is thus formed on the whole of the surface which has been etched by the $SF_6$ plasma, thereby forming a protective film 74.

Figure 2C:
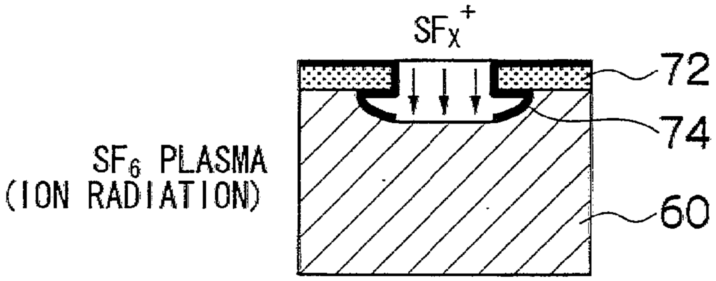
Figure 2D:
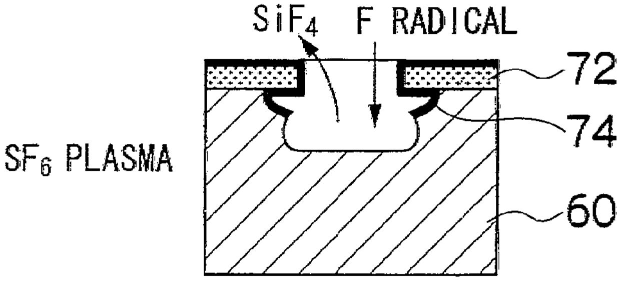

Thereupon, a high-frequency power is applied again to the planar electrode and $SF_6$ plasma generated from $SF_6$ gas is radiated. In this case, as shown in FIG. 2C, most of the ions contained in the $SF_6$ plasma progress toward the bottom surface, and the protective layer 74 constituted by a CF-type polymer layer is removed, at the irradiated portion of the bottom surface. Subsequently, as shown in FIG. 2D, the silicon substrate 60 is etched by means of fluoride radicals in the $SF_6$ plasma, similarly to the case described above with reference to FIG. 2A, at the portion of the bottom surface where the polymer layer has been removed. In this step, the protective film 74 is formed on the side face portions which have been etched in FIG. 2A described above. By reducing the amount of $SF_6$ gas in comparison with the etching described above with reference to FIG. 2A, it is possible to reduce the etched area. The silicon substrate 60 is thus etched into the taper-shape.

Figure 2E:
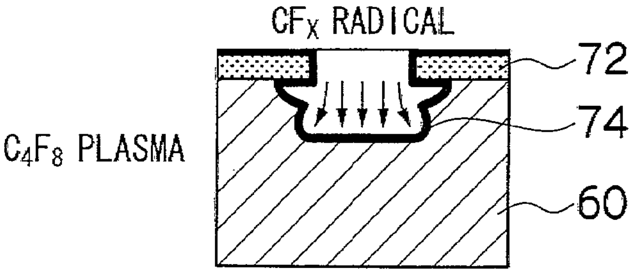

Next, the application of the high-frequency power to the planar electrode is halted again, and as shown in FIG. 2E, a $C_4F_8$ plasma is introduced and a CF-type polymer is formed on the whole of the surface etched by the $SF_6$ plasma, thereby forming a protective film 74, similarly to the case described above with reference to FIG. 2B.

Then, by repeating the etching step and the protective film forming step described above, it is possible to form the tapered section 51A of the nozzle 51 in the silicon substrate 60.

The protective film 74 may be formed under a condition where a high-frequency power is being applied to the planar electrode, provided that conditions for depositing a polymer on the whole of the etched surface are satisfied. Furthermore, the angle of taper can be controlled by adjusting processing times of the etching step (a step of etching the silicon substrate by means of $SF_6$ plasma) and the protective film formation step (a step of forming the protective film 74 by means of $C_4F_8$ plasma).

In the present embodiment, an $SF_6$ gas is used for etching; however, apart from this, it is also possible to use a mixed gas of $SF_6$ and oxygen $O_2$, or fluorine type gas such as $CF_4$ gas (carbon tetrafluoride gas) or $NF_3$ gas (nitrogen trifluoride gas) may be used.

Moreover, in order to form the polymer layer, a $C_4F_8$ gas is used for forming a protective film, in the present embodiment. However, apart from this, it is also possible to use $CHF_3$ gas (methane trifluoride gas), or $C_2F_6$ gas (hexafluoroethane (furon 116) gas). The first method of forming a tapered section 51A of a nozzle 51 has been described above.

Next, a second method of forming the tapered section 51A of a nozzle 51 is described below. In the second method, dry etching is carried out while a protective film 74 is formed on the side faces by using a mixed gas of sulfur hexafluoride ($SF_6$) and octafluorocyclobutane ($C_4F_8$), or oxygen ($O_2$), or methane trifluoride ($CHF_3$), or the like.

Figure 3A:
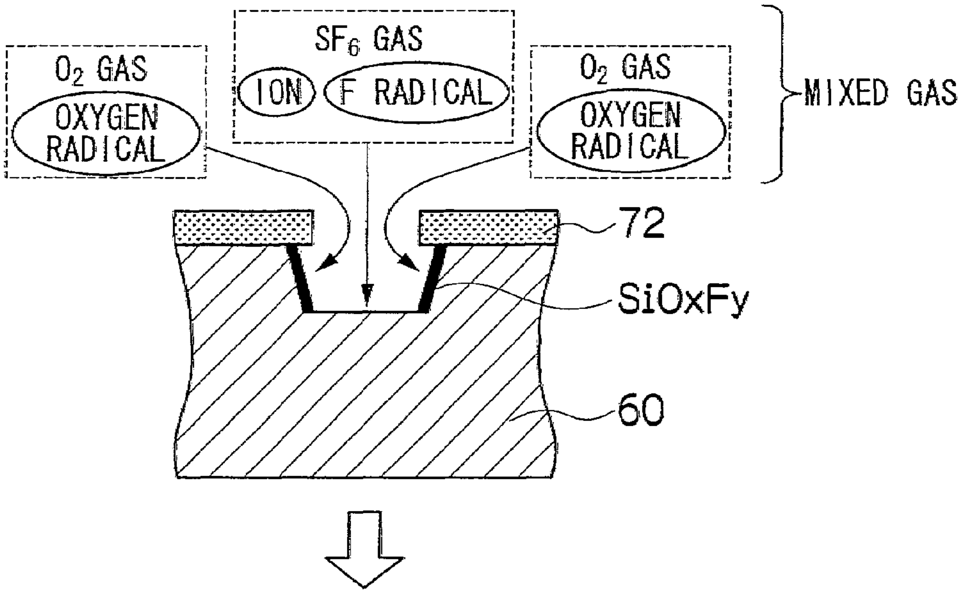
FIGS. 3A and 3B are diagrams showing a second forming method for a tapered section of a nozzle.
Figure 3B:
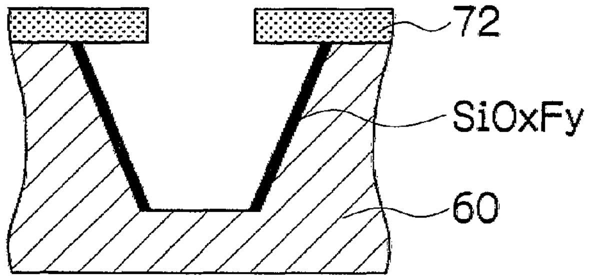

One embodiment of the second forming method in which a combined gas of $SF_6$ gas and $O_2$ gas is used, is described below with reference to FIGS. 3A and 3B. As shown in FIGS. 3A and 3B, $SiO_xF_y$ film is formed as a protective film by means of an $O_2$ plasma generated from $O_2$ gas. On the other hand, ions of $SF_6$ plasma generated from $SF_6$ gas are radiated toward the bottom surface, thereby removing the $SiO_xF_y$ at the portion of the bottom surface in such a manner that a $SiO_xF_y$ film remains on the side faces only. The silicon substrate 60 is etched by the fluorine radicals contained in the $SF_6$ plasma. In the method of this kind, it is possible to form the tapered section 51A of the nozzle 51 by forming a $SiO_xF_y$ film and etching the silicon substrate 60, under conditions of adjusted factors, such as the amount and combination ratio of the mixed gas of $SF_6$ and $O_2$, the RF output power used to generate plasma, the RF bias output power, pressure, substrate temperature, and the like. For the mixed gas, it is also possible to use $SF_6/O_2/C_4F_8$, $SF_6/O_2/CHF_3$, or the like.

Moreover, in performing the etching by means of a mixed gas of $SF_6$ gas and $O_2$ gas (or $SF_6$ gas only), it is possible to form the tapered section 51A of a nozzle 51 while the silicon substrate 60 is set in a low temperature state (cryo process). Under a condition where the silicon substrate 60 is kept at a low temperature (cryo-process), the progress of etching by means of the fluorine radicals toward the side face is restrained, whereas etching is able to progress on the basis of an ion-assistance reaction in terms of the direction toward the bottom surface. In this etching method using the fluorine radicals, it is possible to adjust the etching amount in the direction of each side face, by means of adjusting the temperature used for cryo process (low temperature state). The method described above is the second method of forming the tapered section 51A of a nozzle 51.

The tapered section formation step has been described above.

Figure 1E:
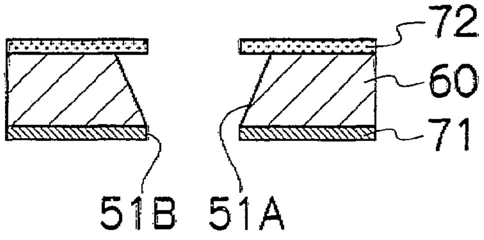

Next, in a linear section formation step, the etching stopper layer 71 is subject to a dry etching, as shown in FIG. 1E. More specifically, etching is carried out by radiating ions from the side of the mask layer 72, using a plasma generated from a gas as described below.

Since the protective film 74 has been formed on the tapered section 51A of the nozzle 51 in the tapered section formation step, as described above with reference to FIGS. 2A to 2E, then it is possible to make the etching progress only in the direction of the bottom surface (toward the bottom surface), without making the etching progress in the directions of the side faces. Moreover, since dry etching is carried out by radiating a dry etching plasma from the side of the mask layer 72, similarly to that in the tapered section formation step described above, then it is possible to align the positions of the central axes of the tapered section 51A and the linear section 51B of the nozzle 51.

Through the linear section formation step, it is possible to form the linear section 51B of the nozzle 51 in the etching stopper layer 71.

Preferably, in the tapered section formation step, the tapered section 51A is formed to have an opening diameter D, at the bottom face side, equal to the diameter d of the opening section in the mask layer 72. In this case, it is possible to readily form the linear section having an opening diameter (cross-sectional diameter) equal to the opening diameter D of the tapered section 51A at the bottom face side. Therefore, the transition between the tapered section 51A and the linear section 51B of the nozzle 51 is smooth and there is no unevenness at the boundary between the tapered section 51A and the linear section 51B, and consequently the inner surface of the nozzle 51 can be formed to an even higher level of accuracy.

The gas used for the dry etching in the linear section formation step is selected in accordance with the material of the etching stopper layer 71. In cases where the material forming the etching stopper layer 71 is an oxide material such as silicon oxide $SiO_2$, for example, it is possible to use a fluorocarbon type gas or a fluorine type gas for the etching gas. In this case, it is also possible to use a mixed gas including a plurality of gases selected from a fluorocarbon type gas and/or a fluorine type gas. Moreover, it is possible to add oxygen, hydrogen, or the like, to the gas described above. Alternatively, it is possible to use a mixed gas in which an inert gas, such as argon (Ar) or helium (He), is mixed with one or a plurality of gases selected from a fluorocarbon type gas and/or a fluorine type gas. Moreover, it is possible to further add oxygen, hydrogen, or the like, to such a mixed gas. Concrete examples of gases which can be used for the dry etching include: $CF_4/H_2$, $CHF_3$, $CHF/SF_6/He$, $C_4F_8/Ar/O_2$, $CF_4/CHF_3/Ar$, $C_2F_6$, $C_3F_8$, $C_4F_8/CO$, $C_5F_8$, and the like. Here, components of mixed gases or added gases are represented in the form of "(gas name)/(gas name)".

If the material forming the etching stopper layer 71 is a nitride material such as silicon nitride SiN, then it is possible to use, as the etching gas, a fluorocarbon type gas, a fluorine type gas, or a mixed gas including a plurality of gases selected from a fluorocarbon type gas and/or a fluorine type gas. Moreover, it is also possible to add oxygen, hydrogen, chlorine, or the like, to the gases described above. Concrete examples of these gases include $CHF_3/O_2$, $CH_2F_2$, $NF_3/Cl_2$, and the like.

Moreover, if the material forming the etching stopper layer 71 is a carbide material, such as a silicon carbide SiC, then oxygen gas or a gas formed by adding a fluorine type gas to oxygen gas is used. Alternatively, it is possible to use ammonia ($NH_3$), hydrogen ($H_2$), nitrogen ($N_2$), or the like. Concrete examples of the gases include $O_2$, $O_2/SF_6$, $O_2/CF_4$, and the like.

The linear section formation step has been described above.

Figure 1F:
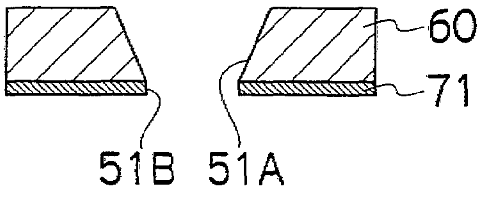

Next, in a mask layer removal step, the mask layer 72 is removed by an ashing process in which oxygen plasma is radiated, as shown in FIG. 1F. Accordingly, the removal of the mask layer 72, and cleaning and hydrophilic treatment of the inner side of the nozzle 51 can be carried out simultaneously, and hence the efficiency of the work can be increased. It is possible to remove the mask layer 72 through a wet process (using removing solution or acetone).

The first embodiment has been described above.

Next, a second embodiment of the present invention is described below.

Figure 4A:
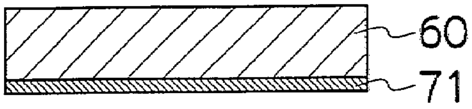
FIGS. 4A to 4G are diagrams showing steps of manufacturing a nozzle plate according to a second embodiment.

FIGS. 4A to 4G are illustrative diagrams showing steps of manufacturing a nozzle plate according to the second embodiment. Firstly, as shown in FIG. 4A, an etching stopper layer formation step is carried out, similarly to that in the first embodiment.

Figure 4B:
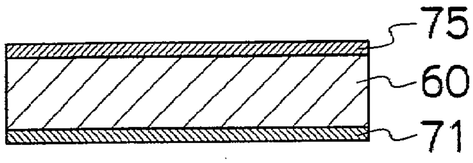

Next, in a mask layer formation step, as shown in FIG. 4B, a mask layer 75 is formed on the surface of the silicon substrate 60 reverse to the surface on which the etching stopper layer 71 has been formed. In this case, unlike the first embodiment, a material other than resist (photosensitive resist) is used for the mask layer 75. More specifically, the material for the mask layer 75 is selected from an inorganic material, such as silicon oxide $SiO_2$, silicon nitride SiN, and silicon carbide SiC, and an organic material such as polyimide, according to the selectivity ratio (etching selectivity) between the mask layer 75 and the silicon substrate 60.

In the method of forming the mask layer 75, the inorganic material or organic material, or the like, can be deposited by vacuum vapor deposition, sputtering, CVD, or the like. Furthermore, if an organic liquid material is used, then the material can be applied by means of a spin coating technique and then cured by heating at a desired temperature. The mask layer 75 may be constituted by a single layer or by a plurality of layers.

Figure 4C:
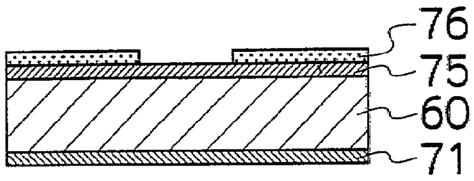

Next, in a photosensitive resin layer formation step, as shown in FIG. 4C, a resist layer 76 is formed on the mask layer 75 and is then patterned by photolithography. More specifically, the resist layer 76 is exposed, and a development process and a post-baking process are then carried out with respect to the exposed resist layer 76. Instead of the post-baking process, UV curing may be carried out.

Figure 4D:
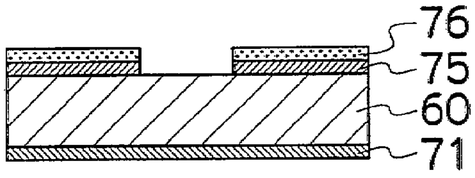

Thereupon, in a mask patterning step, as shown in FIG. 4D, dry etching is carried out using the resist pattern formed in the photosensitive resin layer formation step as a mask, thereby patterning the mask layer 75. In this step, wet etching may also be carried out, instead of the dry etching. Since the mask function in the subsequent linear section formation step can be fulfilled by the mask layer 75 alone, then it is sufficient for the resist to be formed thinly as long as the mask layer 72 can be patterned normally. Hence, the resist can be patterned to a high degree of accuracy, and consequently, it is possible to pattern the mask layer 72 with high accuracy.

Figure 4E:
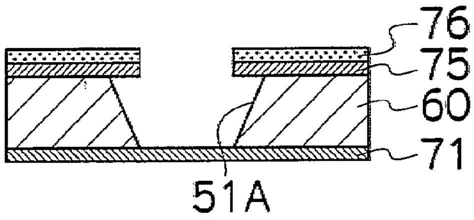
Figure 4F:
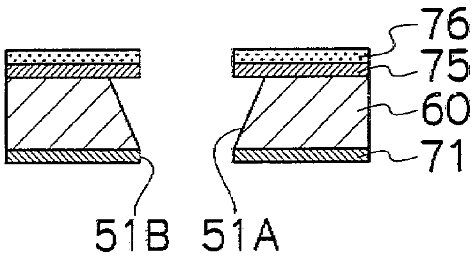
Figure 4G:
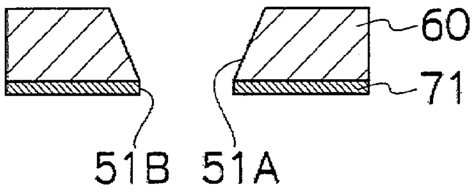

Next, as shown in FIGS. 4E to 4G, a tapered section formation step, a linear section formation step and a mask layer removal step are carried out in a similar fashion to those in the first embodiment.

In the present embodiment, in an oxygen plasma treatment step, the inner side (ink supply side) of the nozzle is cleaned and subjected to a hydrophilic treatment. If a CF type of deposition gas is used in the tapered section formation step, then a fluorine polymer layer is formed on the inner surface of the nozzle 51, and therefore cleaning is carried out preferably by using a sulfuric acid hydrogen peroxide mixture, prior to the oxygen plasma processing step.

The second embodiment has been described above.

Next, a third embodiment of the present invention is described below.

Figure 5A:
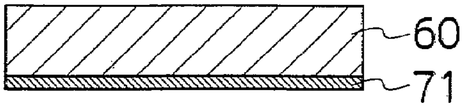
FIGS. 5A to 5H are diagrams showing steps of manufacturing a nozzle plate according to a third embodiment.

FIGS. 5A to 5H are illustrative diagrams showing steps of manufacturing a nozzle plate according to the third embodiment. Firstly, as shown in FIG. 5A, an etching stopper layer formation step is carried out, similarly to that in the first embodiment.

Figure 5B:
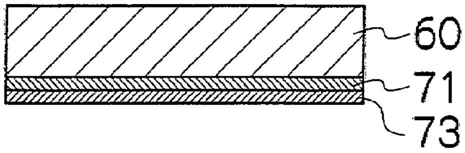

Next, in a liquid repellent film formation step, a liquid repellent film 73 is formed on the etching stopper film 71, as shown in FIG. 5B. The liquid repellent film 73 may be an amorphous fluorine resin or a monomolecular film of fluoroalkylsilane, or other monomolecular films. More specifically, the liquid repellent film 73 is formed, by applying material on the basis of spin coating and then curing the applied material by heating. Moreover, it is also possible to form the liquid repellent film 73 by vacuum deposition, or vapor deposition polymerization, or the like. It is possible to carry out a pretreatment for cleaning of the surface of the substrate, prior to the formation of the liquid repellent film 73.

Figure 5C:
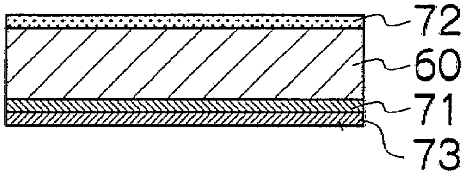
Figure 5D:
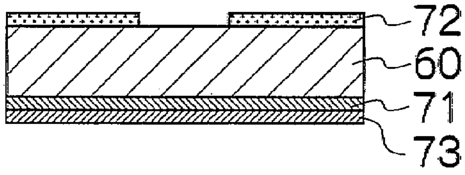
Figure 5E:
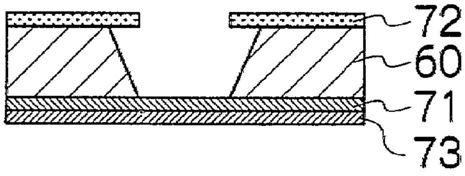

Next, as shown in FIGS. 5C to 5E, a mask layer formation step, a mask patterning step and a tapered section formation step are carried out in a similar fashion to those in the first embodiment.

Figure 5F:
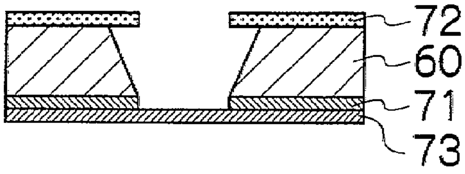
Figure 5G:
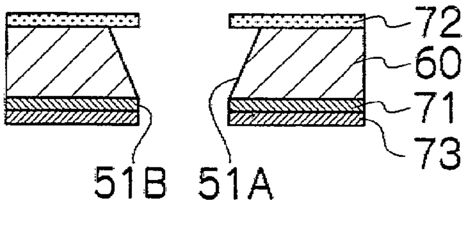

Thereupon, in a linear section formation step, the dry etching of the etching stopper layer 71 is carried out, as shown in FIG. 5F, similarly to that in the first embodiment. Then, as shown in FIG. 5G, the dry etching of the liquid repellent film 73 is carried out. The dry etching of the liquid repellent film 73 is carried out by radiating an oxygen plasma, or the like, from the side of the mask layer 72. In this case, since the liquid repellent film 73 has been formed over the etching stopper layer 71, then the linear section 51B of the nozzle 51 formed by the dry etching of the etching stopper layer 71 functions as a mask. In this way, it is possible to form a hole in the liquid repellent film 73 with high accuracy at the perimeter of the linear section 51B of the nozzle 51 forming the ink ejection port, and therefore the direction of flight of the liquid droplets during ink ejection is stable and the ejection state in the nozzle 51 is satisfactory.

Figure 5H:
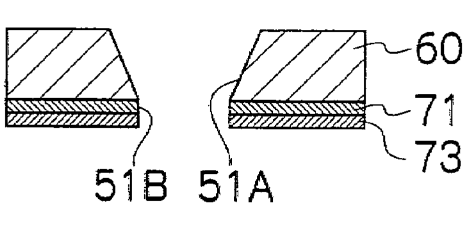

Next, in a mask layer removal step, the mask layer 72 is removed as shown in FIG. 5H. If the mask layer 72 is formed of resist, then the resist may be removed by means of overetching. In this case, the cleaning and the hydrophilic treatment of the inner surfaces of the nozzle 51 can be carried out simultaneously.

In the mask layer removal step, if the mask layer 72 is made of resist (photoresist), then the mask layer 72 (the portions of the mask layer 72 which remain after the linear section formation step described above) can be removed by means of an ashing process using oxygen plasma. On the other hand, if the mask layer 72 is made of a material other than resist (photoresist), then the mask layer 72 may be removed by dry etching.

The third embodiment has been described above.

Structure of the Print Heads

Next, the structure of a print head 50 which uses the nozzle plate 61 manufactured by the method of manufacture described above will be explained. The print heads 12K, 12M, 12C and 12Y provided for the respective ink colors have the same structure, and therefore a reference numeral 50 is hereinafter designated to a representative example of these print heads.

Figure 6:
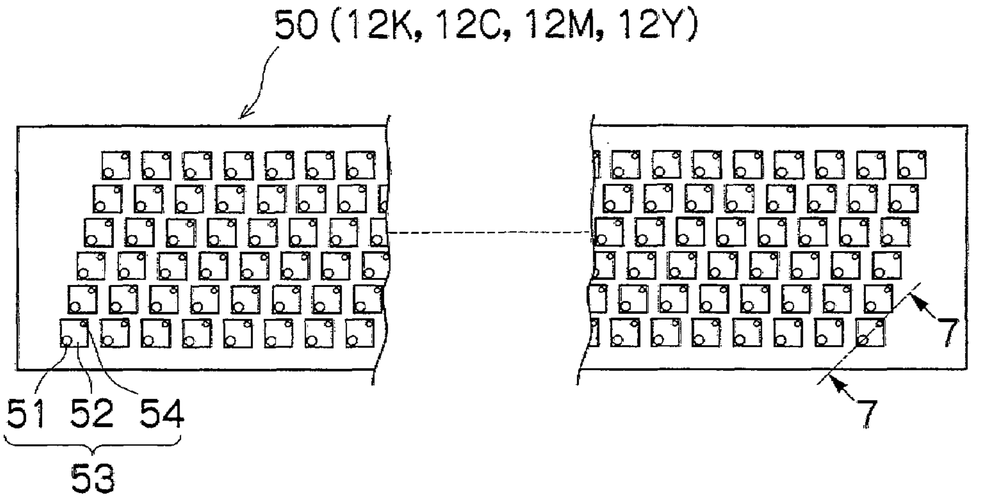
FIG. 6 is a plan perspective diagram showing an embodiment of the structure of a print head.
Figure 7:
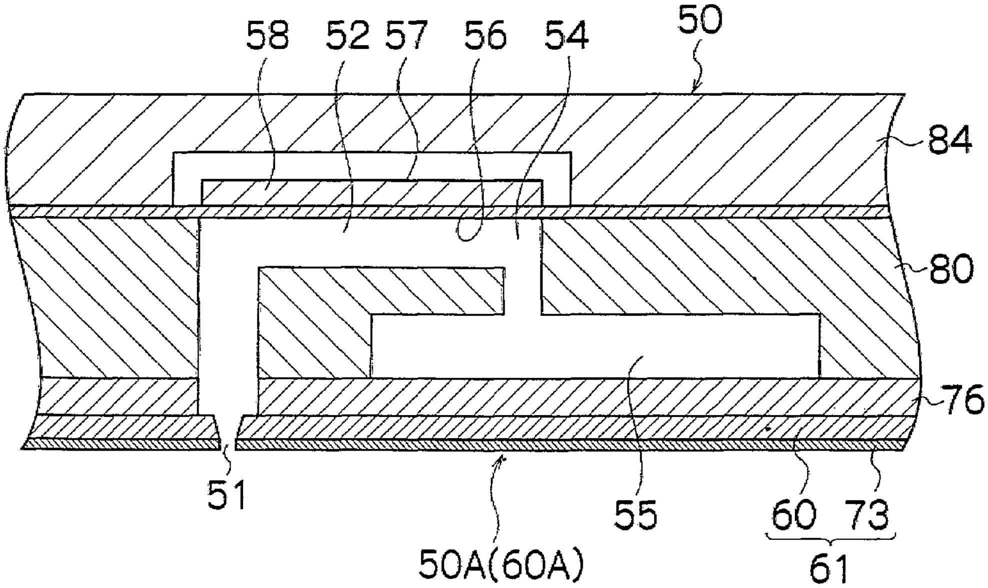
FIG. 7 is a cross-sectional diagram along line 7-7 in FIG. 6.

FIG. 6 is a plan view perspective diagram showing the embodiment of the structure of the print head 50. FIG. 7 is a cross-sectional diagram (along line 7-7 in FIG. 6) showing the three-dimensional composition of one of liquid droplet ejection elements (an ink chamber unit corresponding to one nozzle 51).

The print head 50 principally comprises a nozzle plate 61, a flow channel substrate 76, a pressure chamber substrate 80, a pressurization plate 56, an actuator 58, and a cover 84.

In order to achieve a high density of the dot pitch printed onto the surface of the recording medium, it is necessary to achieve a high density of the nozzle pitch in the print head 50. As shown in FIG. 6, the print head 50 according to the present embodiment has a structure in which a plurality of ink chamber units (liquid droplet ejection elements) 53, each comprising a nozzle 51 which is an ink droplet ejection port, a pressure chamber 52 corresponding to the nozzle 51, and the like, are disposed (two-dimensionally) in the form of a staggered matrix, and hence the effective nozzle interval (the projected nozzle pitch) as projected in the lengthwise direction of the print head (the direction perpendicular to the paper conveyance direction) is reduced (high nozzle density is achieved).

As shown in FIG. 6, the planar shape of the pressure chamber 52 provided to correspond to each nozzle 51 is substantially a square shape, and the nozzle 51 and an inlet for supplying ink (supply port) 54 are disposed in respective corners on a diagonal line of the square shape.

As shown in FIG. 7, the nozzle plate 61 according to an embodiment of the present invention is provided on the nozzle surface (ink ejection surface) 50A of the print head 50. The nozzle plate 61 includes a liquid repellent film 73 and a silicon substrate 60.

Furthermore, each pressure chamber 52 formed in the pressure chamber substrate 80 is connected via a supply opening 54 to a common flow channel 55. The common flow channel 55 is connected to an ink tank (not shown), which is a base tank that supplies ink, and the ink supplied from the ink tank is delivered through the common flow channel 55 to the pressure chambers 52.

A flow channel substrate 76 having connection holes which connect the pressure chambers 52 with the nozzles 51 is bonded to the surface of the silicon substrate 60 reverse to the surface on which the liquid repellent film 73 is formed. An actuator 58 provided with an individual electrode 57 is bonded to the pressurization plate (common electrode) 56 which forms the upper face of each pressure chamber 52. The actuator 58 is deformed when a drive voltage is applied between the individual electrode 57 and the common electrode 56, thereby the volume of the pressure chamber 52 changes, causing ink to be ejected from the nozzle 51 as a result of the change in pressure. A piezoelectric body, such as a piezo element, is suitable as the actuator 58. After ink ejection, new ink is supplied to the pressure chamber 52 from the common flow channel 55 through the supply port 54. The actuator 58 is covered by a cover 84 which is bonded to the pressurization plate (common electrode) 56.

Figure 8:
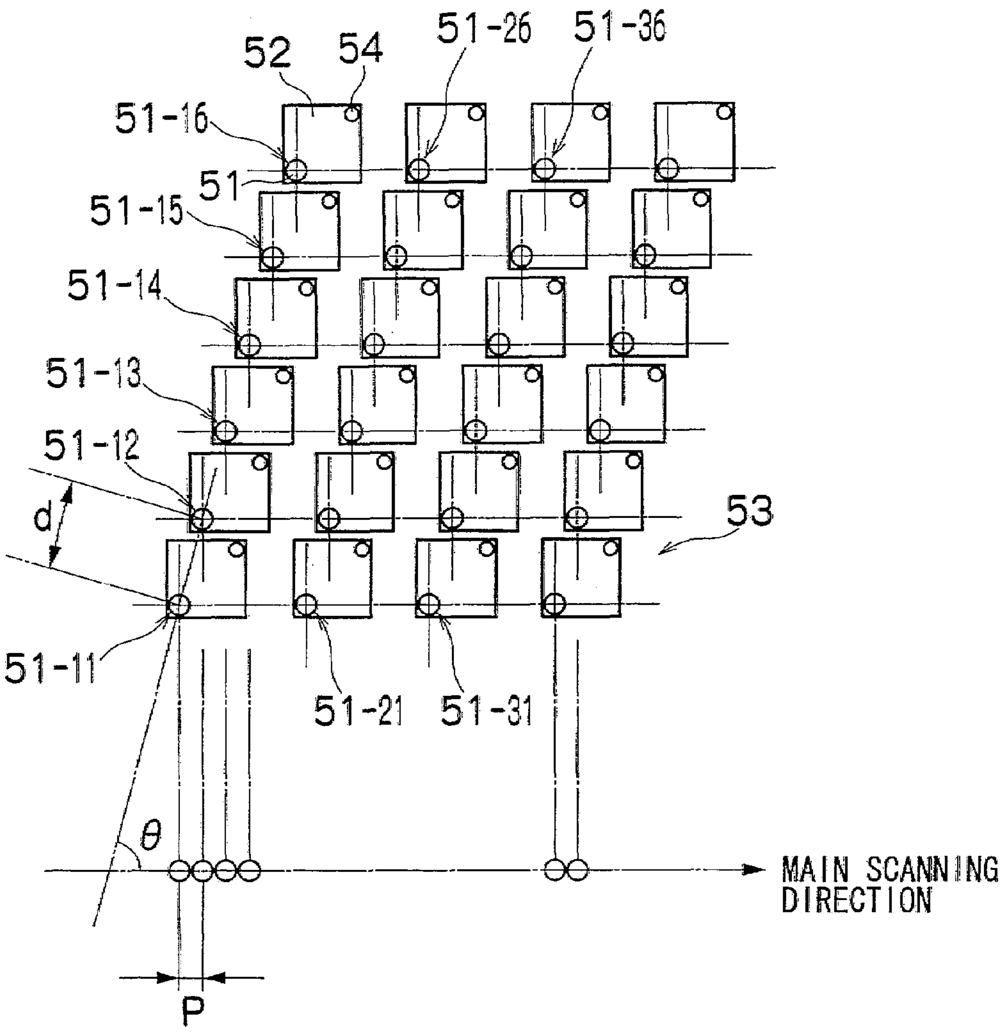
FIG. 8 is a detail diagram showing an enlarged view of a portion of the print head shown in FIG. 6.

As shown in FIG. 8, the plurality of ink chamber units 53 having this structure are composed in a lattice arrangement, based on a fixed arrangement pattern having a row direction which coincides with the main scanning direction, and a column direction which, rather than being perpendicular to the main scanning direction, is inclined at a fixed angle of θ with respect to the main scanning direction. By adopting a structure wherein a plurality of ink chamber units 53 are arranged at a uniform pitch d in a direction having an angle θ with respect to the main scanning direction, the pitch P of the nozzles when projected to an alignment in the main scanning direction will be $d \times \cos\theta$.

More specifically, the arrangement can be treated equivalently to one wherein the nozzles 51 are arranged in a linear fashion at uniform pitch P, in the main scanning direction. By means of this composition, it is possible to achieve a nozzle composition of high density, in which the nozzle columns projected to an alignment in the main scanning direction reach a total of 2400 per inch (2400 nozzles per inch).

In a full-line head comprising rows of nozzles that have a length corresponding to the entire width of the image recordable width, "main scanning" is defined as to print one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix configuration such as that shown in FIG. 8 are driven, it is desirable that main scanning is performed in accordance with (3) described above. In other words, taking the nozzles 51-11, 51-12, 51-13, 51-14, 51-15 and 51-16 as one block (and furthermore, taking nozzles 51-21, . . . , 51-26 as one block, and nozzles 51-31, . . . , 51-36 as one block), one line is printed in the breadthways direction of the recording paper 20 by sequentially driving the nozzles 51-11, 51-12, . . . , 51-16 in accordance with the conveyance speed of the recording paper 20.

On the other hand, "sub-scanning" is defined as to repeatedly perform printing of one line (a line formed of a row of dots, or a line formed of a plurality of rows of dots) formed by the main scanning, while moving the full-line head and the paper relatively to each other.

In implementing the present invention, the arrangement of the nozzles is not limited to that of the example illustrated. Moreover, in the present embodiment, a method is employed where an ink droplet is ejected by means of the deformation of the actuator 58, which is, typically, a piezoelectric element, but in implementing the present invention, there are no particular restrictions on the method used for ejecting ink, and instead of a piezo jet method, it is also possible to apply various other types of methods, such as a thermal jet method, where the ink is heated and bubbles are caused to form therein, by means of a heat generating body, such as a heater, ink droplets being ejected by means of the pressure generated by these bubbles.

General Composition of Inkjet Recording Apparatus

Next, the structure of an inkjet recording apparatus forming an image forming apparatus which uses the above-described print head 50, will be described below.

Figure 9:
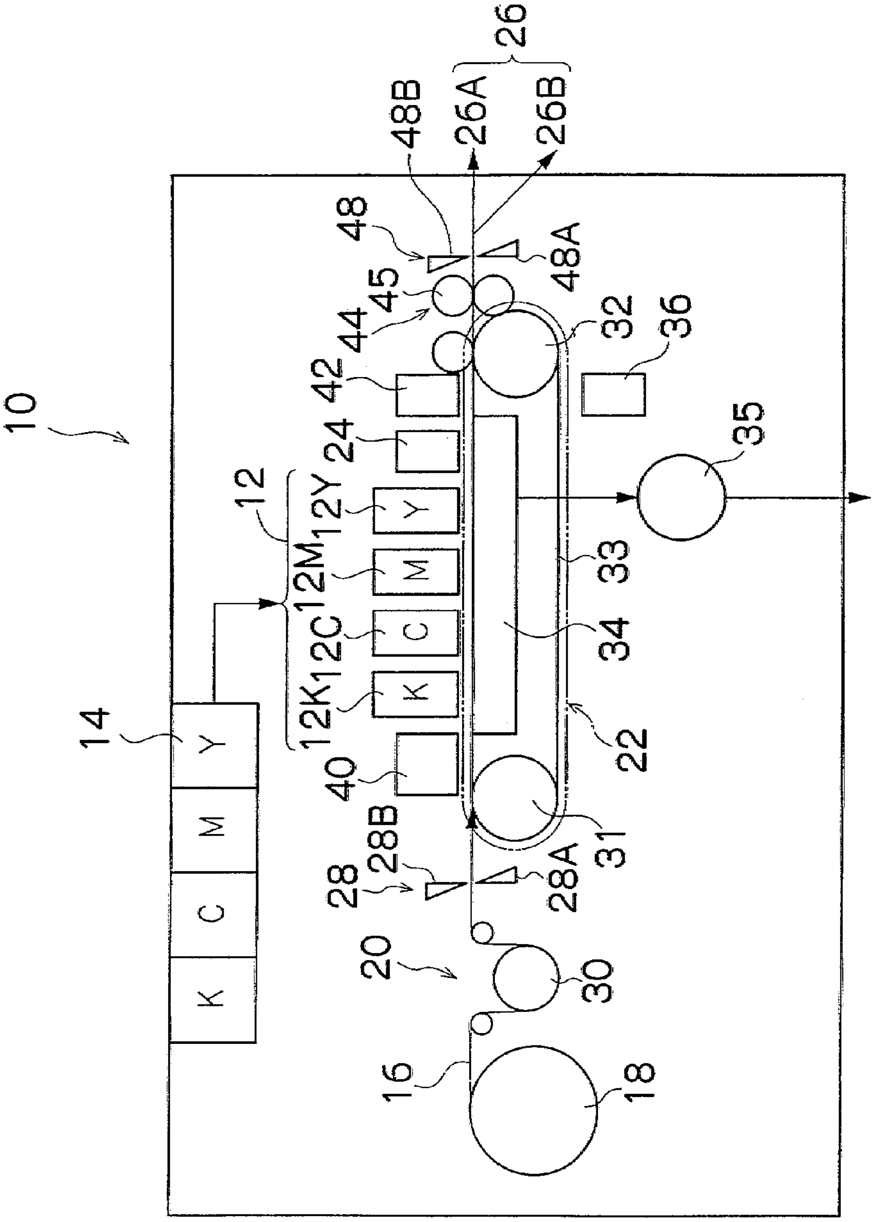
FIG. 9 is a general schematic diagram showing an embodiment of an inkjet recording apparatus serving as an image forming apparatus according to an embodiment of the present invention.
Figure 10A:
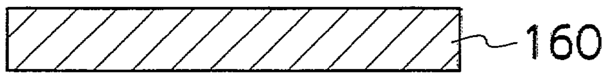
FIGS. 10A to 10F are diagrams showing steps of a manufacturing method in the related art.
Figure 10B:
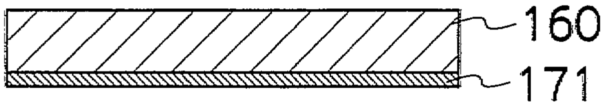
Figure 10C:
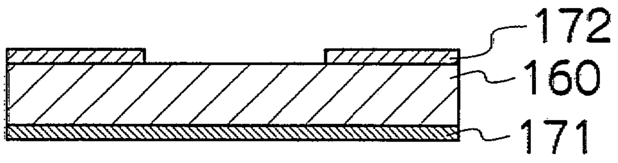
Figure 10D:
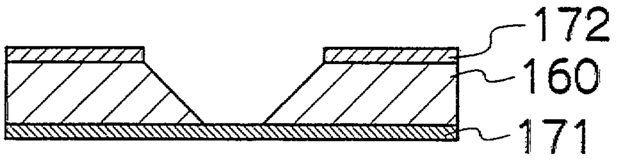
Figure 10E:
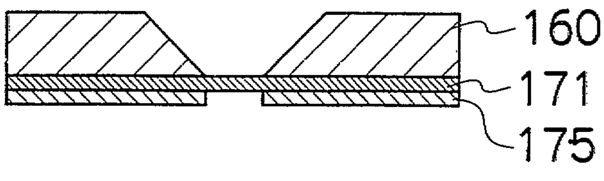
Figure 10F:
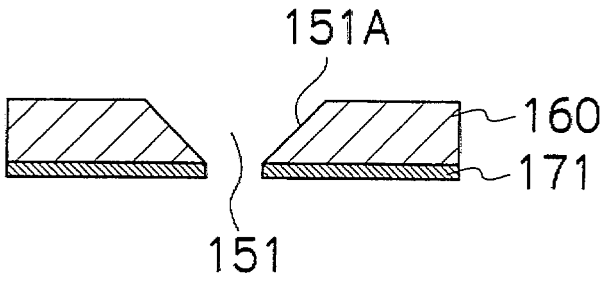

FIG. 9 is a diagram of the general composition showing an outline of an inkjet recording apparatus. As shown in FIG. 9, the inkjet recording apparatus 10 comprises: a print unit 12 having a plurality of print heads 12K, 12C, 12M and 12Y for ink colors of black (K), cyan (C), magenta (M), and yellow (Y), respectively; an ink storing and loading unit 14 for storing inks of K, C, M and Y to be supplied to the print heads 12K, 12C, 12M and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the print unit 12; and a paper output unit 26 for outputting image-printed recording paper (printed matter) to the exterior.

In FIG. 9, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 9, and the roll paper is cut to a desired size by the cutter 28. The cutter 28 has a stationary blade 28A, whose length is not less than the width of the conveyor pathway of the recording paper 16, and a round blade 28B, which moves along the stationary blade 28A.

The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion facing at least the nozzle face of the print unit 12 and the sensor face of the print determination unit 24 forms a plane.

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the print unit 12 on the interior side of the belt 33, which is set around the rollers 31 and 32, as shown in FIG. 9. The suction chamber 34 provides suction with a fan 35 to generate a negative pressure, and the recording paper 16 on the belt 33 is held by suction.

The belt 33 is driven in the clockwise direction in FIG. 9 by the motive force of a motor (not shown in drawings) being transmitted to at least one of the rollers 31 and 32, which the belt 33 is set around, and the recording paper 16 held on the belt 33 is conveyed from left to right in FIG. 9.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the print unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

The print unit 12 is a so-called "full line head" in which a line head having a length corresponding to the maximum paper width is arranged in a direction (main scanning direction) that is perpendicular to the paper conveyance direction (sub-scanning direction) (see FIG. 6).

As shown in FIG. 6, the print heads 12K, 12C, 12M and 12Y which constitute the print unit 12 each comprise line heads in which a plurality of ink ejection ports (nozzles) are arranged through a length exceeding at least one edge of the maximum size recording paper 16 intended for use with the inkjet recording apparatus 10.

The print heads 12K, 12C, 12M and 12Y are arranged in the order of black (K), cyan (C), magenta (M), and yellow (Y) from the upstream side (left side in FIG. 9), along the conveyance direction of the recording paper 16 (paper conveyance direction). A color image can be formed on the recording paper 16 by ejecting the inks from the print heads 12K, 12C, 12M and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the paper conveyance direction (sub-scanning direction) just once (in other words, by means of a single subscan). Higher-speed printing is thereby made possible and productivity can be improved in comparison with a shuttle type head configuration in which a print head moves reciprocally in a direction perpendicular (the main scanning direction) to the paper conveyance direction.

Although the configuration with the KCMY four standard colors is described in the present embodiment, combinations of the ink colors and the number of colors are not limited to those. Light inks or dark inks can be added as required. For example, a configuration is possible in which print heads for ejecting light-colored inks such as light cyan and light magenta are added.

As shown in FIG. 9, the ink storing and loading unit 14 has ink tanks for storing the inks of the colors corresponding to the respective print heads 12K, 12C, 12M and 12Y, and the respective tanks are connected to the print heads 12K, 12C, 12M and 12Y by means of channels (not shown). The ink storing and loading unit 14 has a warning device (for example, a display device, an alarm sound generator or the like) for warning when the remaining amount of any ink is low, and has a mechanism for preventing loading errors among the colors.

The print determination unit 24 has an image sensor (line sensor) for capturing an image of the ink-droplet deposition result of the print unit 12, and functions as a device to check for ejection defects such as clogs of the nozzles from the droplet ejection image read by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the print heads 12K, 12C, 12M and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming into contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively.

When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in drawings, the paper output unit 26A for the target prints is provided with a sorter for collecting prints according to print orders.

Methods of manufacturing a nozzle plate, liquid droplet ejection heads and image forming apparatuses according to embodiments of the present invention have been described in detail above, but the present invention is not limited to the aforementioned embodiments, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A liquid ejection head, comprising:

a nozzle plate which includes a nozzle having a tapered section and a linear section and is manufactured by:

forming an etching stopper layer for stopping dry etching of a silicon substrate, on a first surface of the silicon substrate;

forming a mask layer on a second surface of the silicon substrate reverse to the first surface;

performing a first patterning process with respect to the mask layer so that an opening section is formed in the mask layer;

carrying out the dry etching of the silicon substrate through the opening section in the mask layer so that the tapered section of the nozzle is formed in the silicon substrate;

carrying out dry etching of the etching stopper layer through the opening section in the mask layer so that at least a part of the linear section of the nozzle is formed in the etching stopper layer; and removing the mask layer, wherein an opening diameter of the formed tapered section at the etching stopper layer side is equal to the diameter of the opening section in the mask layer.

2. An image forming apparatus comprising the liquid ejection head according claim 1.

* * * * *